Jan. 31, 1933.  F. M. HOLDEN  1,896,026
HARMONIC BALANCER WITH COIL SPRINGS
Filed Dec. 3, 1926
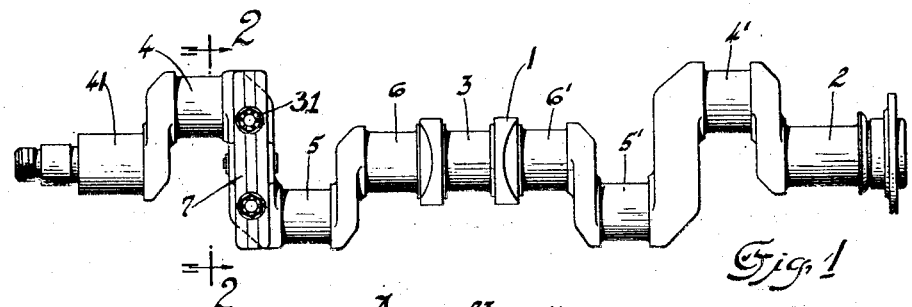
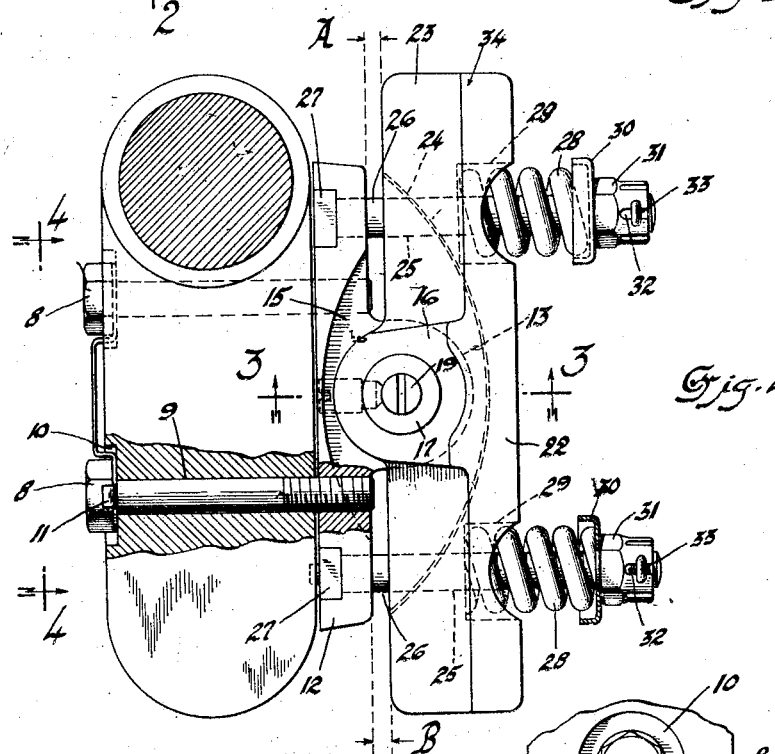
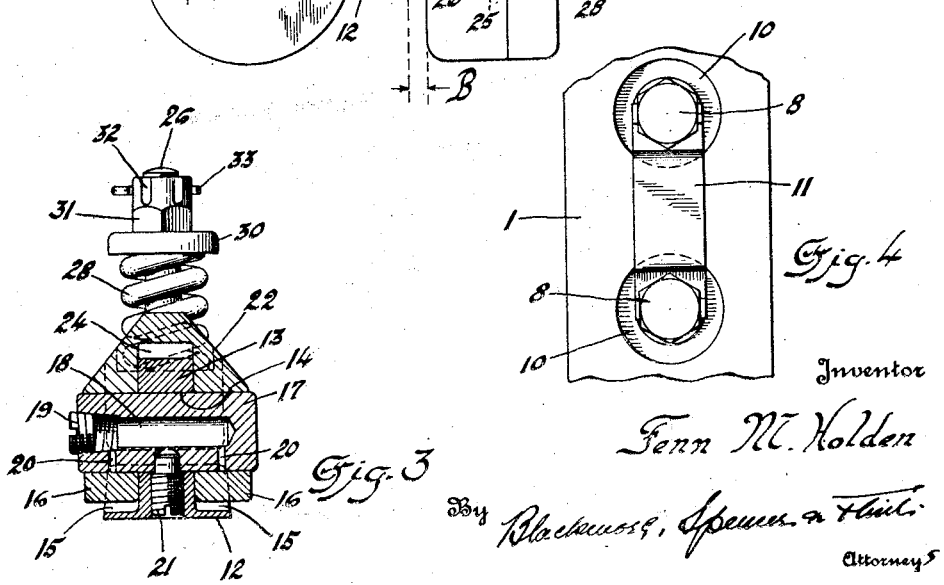
Inventor
Fenn M. Holden
By Blackmore, Spencer & Hull
Attorneys Patented Jan. 31, 1933

1,896,026

UNITED STATES PATENT OFFICE

FENN M. HOLDEN, OF PONTIAC, MICHIGAN, ASSIGNOR, BY MESNE ASSIGNMENTS, TO PACKARD MOTOR CAR COMPANY, OF DETROIT, MICHIGAN, A CORPORATION OF MICHIGAN

HARMONIC BALANCER WITH COIL SPRINGS

Application filed December 3, 1926. Serial No. 152,424.

This invention relates to a harmonic balancer with coil springs for use on crankshafts, and particularly with respect to the multi-throw high-speed crankshafts of motor vehicles.

Due to the forces exerted upon high-speed multi-throw crankshafts of motor vehicles and because of the shape of the shaft, when the explosion in a cylinder occurs and the piston is forced down, the crankshaft is driven around, and because of the force of the explosion there is a tendency to distortion or whip in the crankshaft. This flexure occurs about the axis through the center line of the main bearings. This whip is very slight and immeasurable by ordinary means but a succession of shocks not only forces the shafts to respond to the shocks, but starts it vibrating at a particular rate per second. This characteristic is called "harmonic vibration" and it is the purpose of my balancer and the object of my invention to overcome this distortion or whip.

It has been previously proposed to use leaf springs incorporated within a balancer but I have found that by the use of coil spring the spring pressure opposes the centrifugal force acting on the weight so that the resultant load on the pivot pin is less, giving:

(a) Reduced wear on the pin.

(b) Reduced friction on the pin resulting in greater sensitivity of the device used to produce the desired reactions.

(c) Less bending load on the weight. This permits the use of cast iron instead of steel.

The new construction also makes it convenient to use coil springs instead of flat springs which results in less internal friction in the springs and thereby increases the sensitivity of the device as outlined under (b) above.

My new structure further provides for easy adjustability of the spring pressure thus eliminating many machining operations to close limits and also is less expensive to manufacture.

In the drawing:

Figure 1 is a view of the crankshaft of an automobile with my balancer attached.

Figure 2 is an enlarged section on line 2—2 of Figure 1 looking in the direction of the arrows, parts being shown in section.

Figure 3 is a section on line 3—3 of Figure 2 looking in the direction of the arrows.

Figure 4 is an end view of Figure 2 looking in the direction of the arrows on line 4—4 of Figure 2.

Referring to Figure 1, 1 indicates the crankshaft having three bearings 2, 3 and 41 and two sets of crank pins 4, 5, 6 and 4', 5', 6', the respective pins of each pair being arranged 120° apart as is customary in six cylinder engines.

The front end of the shaft is at the bearing 41 and it is at this end that my harmonic balancer 7 is mounted. The balancer is preferably placed between the two crank pins 4 and 5 and is secured to the shaft by means of the threaded bolts 8 passing through openings 9 and having their heads countersunk in recesses 10 in the shaft although any other suitable securing means may be used. Any suitable nut lock, such as 11 may be provided to keep the bolts 8 from turning.

My improved balancer comprises a base plate 12 having a central ear 13 provided with an aperture 14. The plate 12 may be a forging integral with the shaft but is preferably constructed as shown. This base plate has arcuate recesses 15 at both sides of the ear 13 the purpose of which is to accommodate a yoke 16 which embraces the ear 13 and is pivotally secured thereto through the intermediary of a pin 17. This pin is secured to the plate 12 by means of a set screw 21 and has a central oil containing recess 18 closed by a plug 19, and also oil grooves 20 which conduct the lubricant to the journal between the pin 17 and yoke 16.

The balancer further comprises the oscillatory reaction bar or weight member 34 which may vibrate on an axis parallel and in a plane transverse to the shaft and has a tapered outer portion 22 and a rectangular inner portion 23, an arcuate recess 24 being formed from the base of the inner portion and reaching up into the tapered outer portion. This weight member has a length considerably greater than that of the base plate 12 and is provided at either end with an opening 25 for the reception of bolts 26 whose heads 27 are countersunk into the base plate 12. The outer ends of the bolts 26 are screw threaded and coil springs 28 are slipped over these bolts and have one end entering and seated in a recess 29 in the tapered portion 22 of the weight member 34 and have their other ends confined by means of a cupper washer 30 held in place by a nut 31, having recesses 32 for the reception of a cotter pin 33 which passes through the bolt 26 and locks the nut 31 against turning.

In assembling the springs 28 the distances A and B should be kept equal, then the nuts 31 are turned down until the slack is taken up but without placing any tension on the springs; each nut is then given half a turn and the cotter pins 33 inserted to secure the nuts 31. The various parts are smooth, all burrs and sharp edges having been removed.

Having described my invention, what I claim is:

1. In a balancer for crankshafts, a weight supported for pivotal movement with respect to said shaft, bolts anchored to said shaft and passing through said weight, and springs secured between said weight and bolts.

2. In a balancer for crankshafts comprising a base plate secured to the shaft, a weight pivoted to said plate, bolts anchored in said plate and passing through said weight, and springs secured between said weight and bolts at the outer side of said weight.

3. In a balancer for crankshafts comprising a base plate secured to the shaft, a weight member pivoted to the plate, bolts anchored in the base plate and passing through the weight member, coil springs surrounding said bolts and contacting with said weight, and means to secure said springs on said bolts.

4. In a balancer for crankshafts comprising a base plate secured to the shaft, a weight pivoted to the plate, bolts anchored in said plate and passing through openings in said weight at both sides of the pivot, coil springs associated with said weight and surrounding said bolts, and means for securing said springs on said bolts.

5. In a balancer for crankshafts comprising a base plate secured to the shaft, a weight member pivoted to the plate, said member having recesses, bolts anchored in said plate and passing through said member, coil springs surrounding said bolts and seating in said recesses, and means for securing the springs on the bolts.

6. In a balancer for crankshafts, a base plate, a weight member, a central pivotal connection between said plate and member, said member having openings and recesses at opposite sides of said connection, bolts carried by the base plate and passing through said openings and recesses, coil springs surrounding said bolts and seated in said recesses, and means for holding said springs on said bolts.

7. The combination of a shaft, of means for counteracting vibrations comprising a mass pivotally connected to the shaft about an axis parallel with and eccentric with respect to the shaft axis, and means associated with the shaft and the mass comprising springs bearing upon the mass at points on opposite sides of the pivotal axis of mass and exerting their elastic force to press the mass toward the shaft axis.

8. A crankshaft device including a high speed multithrow crankshaft, a member operatively connected thereto to vibrate out of phase therewith about an axis parallel to the axis about which the shaft turns, and spring means contacting with the outer side of said member and operatively interrelated with said shaft.

9. In a crankshaft balancer, a weight pivotally connected to the shaft, a plurality of members carried by and projecting away from the shaft and past the outer side of said weight, resilient means positioned on said members and contacting with said weight, and means to hold said resilient means on said members.

10. The combination with a shaft, of means for counteracting vibrations comprising a mass supported for pivotal movement with respect to the shaft about an axis parallel with and eccentric with respect to the shaft axis, and coil springs acting between said shaft and mass, said springs being positioned on the outermost side of said mass and bearing upon the mass at points on opposite sides of the pivotal axis of the mass and exerting their elastic force to press the mass toward the shaft axis.

11. A crank shaft device including a crank shaft, a member connected thereto to vibrate out of phase therewith about an axis parallel to the axis about which the shaft turns, and coil springs contacting said member on the outer side thereof and operatively interrelated with said shaft.

12. In a crank shaft balancer, a weight pivotally connected to the shaft, a plurality of members passing through said weight and carried by and projecting away from the shaft and past the outer side of said weight, resilient means positioned on said members and contacting said weight, and means to hold said resilient means on said members.

13. In a crank shaft balancer, a weight pivotally connected to the shaft, a plurality of guide members projecting past the outer side of said weight, coil springs positioned on and guided by said members and contacting said weight, and means to hold said springs on said members.

14. A vibratory device including a shaft, a member movably mounted on said shaft having its center of mass offset from the axis of the shaft and responsive to vibratory and centrifugal forces, and spring means acting between said member and said shaft to oppose motion of the member in response to either of said forces.

15. A device including a shaft, a member mounted on said shaft having its center of mass offset from the axis of the shaft said member being movable in response to vibratory forces set up in the shaft and subjected to centrifugal force, and spring means connected between the weight and the shaft to oppose said movement and the centrifugal force.

16. A crank shaft device including a crank shaft, a member mounted thereon to vibrate about an axis other than the crank shaft axis, bolts connected with the crank-shaft and extending through said member, and coil springs connected between the bolts and said member to oppose centrifugal and vibratory movement of said member.

17. The combination with a rotatable shaft, of a weight supported on said shaft for pivotal movement with respect thereto, and resilient means associated with the shaft and weight and exerting thrust on said weight to oppose the action of centrifugal force thereon, the direction of the said thrust being other than perpendicular to a line connecting the center of mass of the weight and the point of pivotal support therefor to relieve the load on said pivotal point due to centrifugal force.

18. In combination with a rotatable shaft, a weight pivotally connected to the shaft, springs associated with said shaft and weight and positioned outwardly of said weight and exerting thrust thereon to oppose the centrifugal force of the weight when the shaft rotates, the direction of the said thrust being other than perpendicular to a line connecting the center of mass of the weight and the point of pivotal support therefor to relieve the load on said pivotal point due to centrifugal force.

19. The combination with a crankshaft subject to torsional vibrations, of an inertia mass, means for supporting said mass on said shaft for oscillatory movement in response to torsional vibrations, the center of gravity of said mass being offset from the axis of the shaft, and resilient means acting between said mass and shaft for resisting movement of said mass and opposing the action of centrifugal force thereon.

20. The combination with an engine crankshaft having a crank arm, of an inertia mass having a slotted opening in the plane of rotation of said arm, a member projecting from the crank arm through said opening, a pivot pin connecting said member and the mass, and locking means for said pin carried by said projecting member.

In testimony whereof I affix my signature.

FENN M. HOLDEN.